Feb. 26, 1957 H. BRANDENBERGER 2,782,669
MECHANISM FOR COPY TURNING
Filed July 2, 1952 2 Sheets-Sheet 1

INVENTOR.
HEINRICH BRANDENBERGER
BY

Feb. 26, 1957  H. BRANDENBERGER  2,782,669
MECHANISM FOR COPY TURNING
Filed July 2, 1952  2 Sheets-Sheet 2
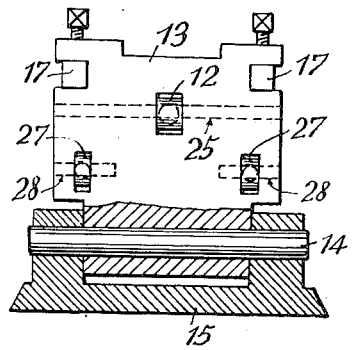
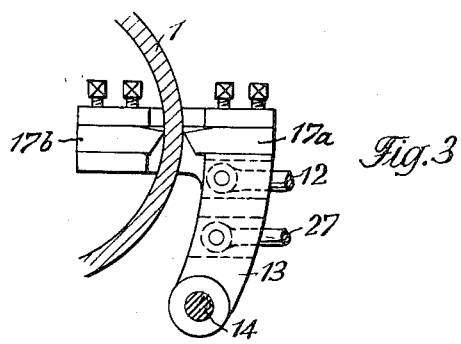
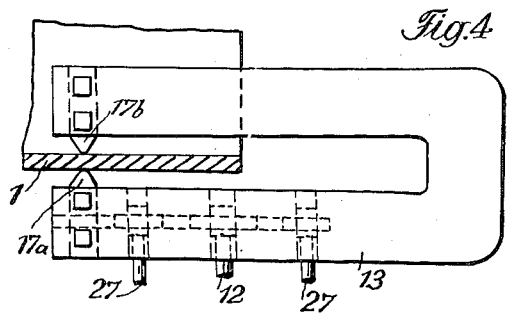
INVENTOR.
HEINRICH BRANDENBERGER
BY United States Patent Office 2,782,669
Patented Feb. 26, 1957

2,782,669

MECHANISM FOR COPY TURNING

Heinrich Brandenberger, Zurich, Switzerland

Application July 2, 1952, Serial No. 296,906

Claims priority, application Switzerland August 2, 1951

5 Claims. (Cl. 82—19)

This invention relates to a mechanism for copy turning, which allows to generate with one and the same copy cam diameters of various sizes as well as variously shaped forms. To produce parts of unround cylindrical shape represents an important problem and occurs, for instance, in the production of turned piston rings. All copy mechanisms known so far have various disadvantages. In some known constructions there is no positive operative connection between the tool and the copy cam, that is to say, the reaction pressure of the tool is not taken up by the cam itself. Furthermore the whole mechanism does not partake at the longitudinal motion of the tool, so that the parts during operation change their position with respect to each other, whereby inaccuracies arise. The parts carrying the tool are, moreover, formed as slides, so that on the one hand they do not permit high speeds and on the other hand the slides, particularly when more than one tool is employed, create unfavourable frictional conditions, which are prejudicial to high accuracy.

It is an object of the present invention to overcome the disadvantages of the conventional constructions of copy turning mechanism. According to the invention, the mechanism is so arranged that in one direction the reaction pressure of the tool is indirectly taken up by the cam, the slope of this latter being the negative of the profile to be imparted to the workpiece while in the other direction any back lash is absorbed by springs. The more or less pronounced radial profiles, as they are required when machining work pieces of equal, greater or smaller diameters than that of the copy cams, are obtained by an adjustable movement transmission member located between two swingable levers. One of the levers carries a cam follower cooperating with the copy cam, while the other lever transmits its motion over a linkage to a tool holder. The latter is also formed as lever and can be adjusted transversely to the axis of the working piece according to the desired diameter of said piece. The whole mechanism, moreover, partakes on the longitudinal motion of the tool relative to the work piece, so that the forces between the various parts of the mechanism come into effect during the longitudinally progressing turning operation always in a single plane which moves along with the longitudinally progressing tool.

The present invention will now be described more fully with reference to the accompanying drawing illustrating, by way of example, certain preferred embodiments of the invention.

Fig. 2 is a front view, partly shown in section, of a tool holder used in the copy lathe and carrying a roughing cutter and a finishing cutter adapted to become effective one after the other.

Fig. 3 is a view in elevation of a tool holder with the work piece shown in section, the tool holder having two cutters simultaneously machining opposite faces of the work piece.

Fig. 4 is a plan view of the tool holder according to Fig. 3.

Figure 1:
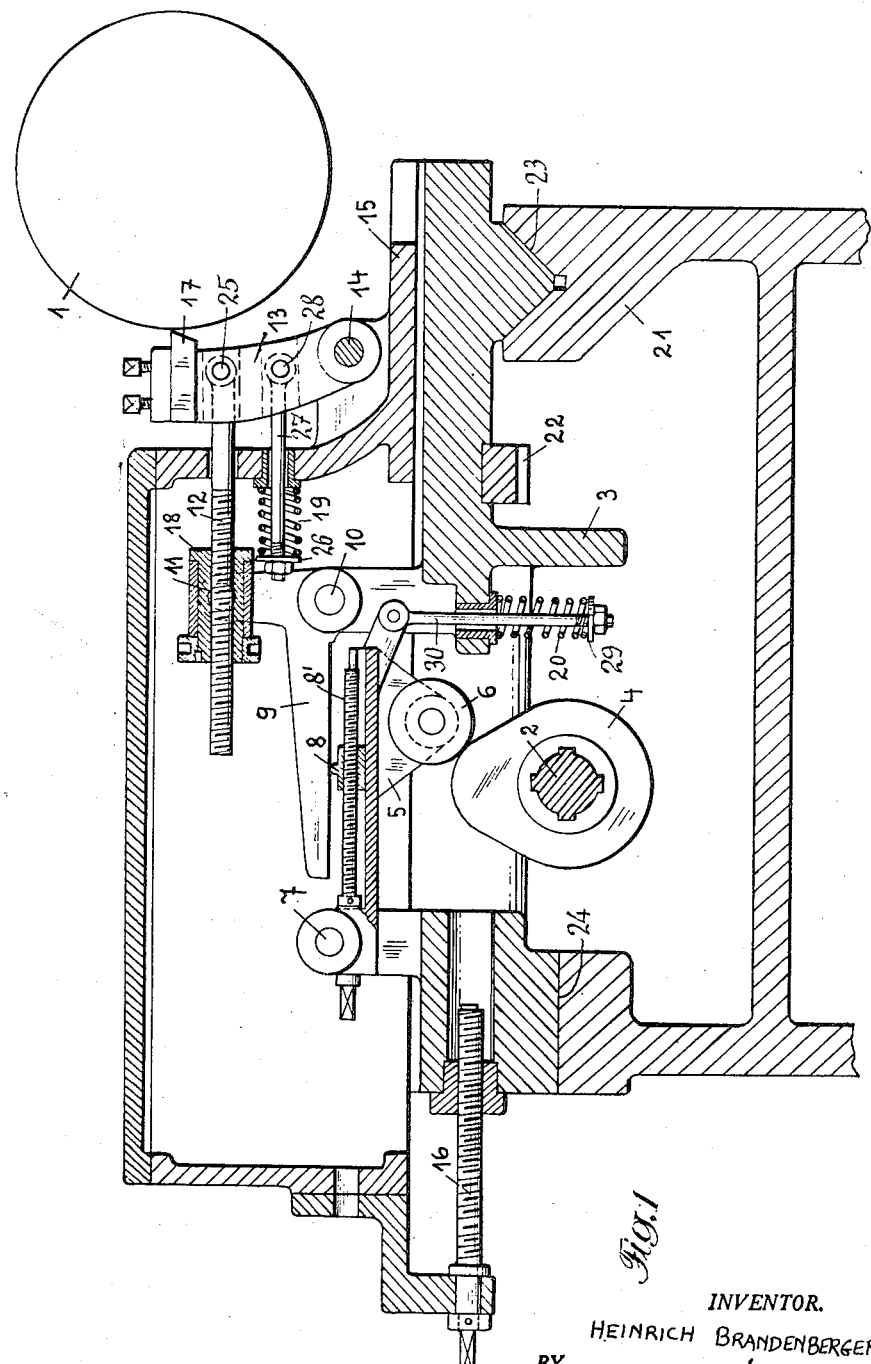
Fig. 1 is a vertical transverse section through a copy lathe embodying the principles of my invention.

The work piece 1 is mounted for rotation between drive members which are operatively and positively connected, in a manner not shown, by means of gears with the cam shaft 2.

The cam shaft 2 is formed with keyways and has mounted thereon a cam 4 turning with the shaft and longitudinally movable with respect to the shaft. The cam 4 is mounted for longitudinal movement together with a carriage 3 and cooperates with a cam follower 6 carried by a lever 5 pivotally mounted on a journal pin 7 of the carriage 3. Upon rotation of the cam 4, the lever 5 always effects a uniform swinging motion about the journal 7, in accordance with the shape of the cam. The lever 5 carries a movable nose 8 serving as movement transmission member and formed as nut engaged on an adjusting screw 8'. A two-armed lever 9 is pivotally mounted on a journal pin 10 carried by the carriage 3 and has one arm resting on the nose 8. According to the position of the nose 8 along the lever arm, a pivoting movement of variable amplitude is imparted to the lever 9 by the lever 5.

The lever 9 carries an internally threaded sleeve 18 by means of a hinge connection 11. The sleeve 18 is engaged on a screw-threaded rod 12 which is pivotally connected by means of a pin 25 to a tool holder 13, in turn pivotally mounted at 14 on a slide 15. The transverse position of the slide 15 relatively to the work piece 1 is adjusted by means of a screw 16 according to the diameter of the work piece. The position of the tool 17 is adjusted by means of the nut 18 movable along the rod 12.

As shown in Fig. 2, two tools 17 can be arranged on the holder 13 so that one serves as roughing tool and the other as finishing tool, coming into action one after the other. Springs 19 and 20 take up any back lash of the mechanism. The spring 19 acts against a washer 26 carried by a rod 27 pivotally mounted at 28 on the tool holder 13. The spring 20 acts against a washer 29 carried by a rod 30 pivotally connected to lever 5. The carriage 3 is moved on the bed 21 along guideways 23 and 24 in order to produce the cylindrical surface of the working piece; movement may be transmitted to the carriage by means of a rack 22.

Besides the usefulness already described, the mechanism according to this invention offers the following advantages: attainment of high speeds, since all the movement transmission parts between the copy cam and the tool are constructed as levers and therefore effect pivoting motions only; separation of the tool holder exposed to chips from the parts producing the variable motion; construction of the tool holder as swinging lever, so that two tools can be arranged without influencing thereby the accuracy of the copy motion, and formation of the members producing the variable motion as separate parts, whereby it is possible to attain high transmission ratios.

In the example according to Figs. 3 and 4 the tool holder 13 carries two cutters 17a and 17b adapted to engage opposite faces of a work piece, represented by a receptacle. Operation of this example is the same as described with reference to Fig. 1, the two cutters simultaneously machining the outer and the inner face of the receptacle according to the required shape as imparted by the copy cam.

It is, of course, to be understood that the above description is merely illustrative and in no wise limiting and I desire to comprehend within my invention such modifications as are included within the scope of the appended claims.

What I claim, is:

1. In a copying mechanism, in combination, a carriage movable in one direction and adapted to move in longitudinal direction of a work piece; a tool slide mounted on said carriage movable in a direction transverse to said one direction; adjusting means for adjusting the position of said tool slide to the diameter of a work piece, said adjusting means moving said tool slide on said carriage; a tool holder pivotally mounted on said tool slide for oscillating movement in a direction transverse to said one direction between a tool advancing position and a tool retracting position; a continuously rotating drive shaft means having an axis extending in said one direction; a copy cam mounted on said shaft means for rotation therewith and slidable in axial direction of the same, said copy cam being moved along said shaft means with said carriage; a cam follower roller engaging said cam; a first lever pivotally mounted on said carriage and supporting said cam follower roller and being oscillated by said cam; a second lever pivotally mounted on said carriage at a fixed distance from said first lever; a movable adjusting element movably mounted on said first lever located intermediate said two levers and engaging said second lever for transmitting the movement from said first lever at a variable ratio to said second lever; and an adjustable member of variable length having ends pivotally mounted on said second lever and on said tool holder, respectively, said adjustable member extending in said transverse direction and being adapted to adjust said tool advancing and tool retracting positions of said tool holder, said cam, said levers, said tool holder, and said adjustable element being arranged in a single transverse plane.

2. In a copying mechanism as claimed in claim 1 wherein said first and second levers have parallel arms extending from the associated fulcrums in opposite directions, and wherein said adjusting element consists of a threaded spindle secured to said first lever and extending parallel to and intermediate said arms, and a threaded nut movable on said threaded spindle and having a projection engaging said arm of said second lever.

3. In a copying mechanism as claimed in claim 1 wherein said adjustable member of variable length is composed of a threaded spindle pivotally connected to said tool holder, and of a threaded sleeve mounted on said threaded spindle, and being pivotally connected to said second lever.

4. In a copying mechanism as claimed in claim 1 wherein said tool holder includes two means spaced in said one direction and adapted to hold a roughing tool, and a finishing tool, respectively.

5. A copying mechanism as claimed in claim 1 and including two cutters mounted on said tool holders facing each other in opposite direction and adapted to simultaneously machine opposite faces of a work piece.

References Cited in the file of this patent

UNITED STATES PATENTS

| | | |
|---|---|---|
| 64,420 | Holroyd | May 7, 1867 |
| 697,265 | Mills | Apr. 8, 1902 |
| 707,472 | Welter et al. | Aug. 19, 1902 |
| 735,138 | Normand | Aug. 4, 1903 |
| 955,643 | Hanson | Apr. 19, 1910 |
| 1,081,470 | Sosa | Dec. 16, 1913 |
| 1,214,236 | Steindorff | Jan. 30, 1917 |
| 1,259,770 | Olson | Mar. 19, 1918 |
| 1,291,118 | Plantinga | Jan. 14, 1919 |
| 1,893,916 | Waldrich | Jan. 10, 1933 |
| 2,047,869 | Harley | July 14, 1936 |
| 2,253,028 | Hassig | Aug. 19, 1941 |
| 2,704,480 | Junker | Mar. 22, 1955 |

FOREIGN PATENTS

| | | |
|---|---|---|
| 30,838 | Austria | Nov. 25, 1907 |